US010893199B2

(12) United States Patent
Kaibara

(10) Patent No.: US 10,893,199 B2
(45) Date of Patent: Jan. 12, 2021

(54) IMAGING APPARATUS AND CONTROL METHOD THEREOF

(71) Applicant: CANON KABUSHIKI KAISHA, Tokyo (JP)

(72) Inventor: Hiroshi Kaibara, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/423,528

(22) Filed: May 28, 2019

(65) Prior Publication Data

US 2019/0379831 A1 Dec. 12, 2019

(30) Foreign Application Priority Data

Jun. 7, 2018 (JP) .................................. 2018-109487
Feb. 19, 2019 (JP) .................................. 2019-027408

(51) Int. Cl.
*H04N 5/232* (2006.01)
*H04N 5/262* (2006.01)
(Continued)

(52) U.S. Cl.
CPC ....... *H04N 5/23245* (2013.01); *H04N 5/2353* (2013.01); *H04N 5/2628* (2013.01); *H04N 5/378* (2013.01); *H04N 5/37455* (2013.01)

(58) Field of Classification Search
CPC .. H04N 5/23245; H04N 5/2628; H04N 5/378; H04N 5/37455; H04N 5/2353
See application file for complete search history.

(56) References Cited

U.S. PATENT DOCUMENTS 9,281,014 B2 3/2016 Seto et al.
2007/0025722 A1* 2/2007 Matsugu ................ G03B 17/16
396/263

(Continued)

FOREIGN PATENT DOCUMENTS

JP 2007-134806 A 5/2007
JP 2010-011145 A 1/2010
(Continued)

OTHER PUBLICATIONS

Sep. 24, 2020 Japanese Official Action in Japanese Patent Appln. No. 2019-027408.

*Primary Examiner* — Ahmed A Berhan
(74) *Attorney, Agent, or Firm* — Venable LLP

(57) ABSTRACT

An imaging element includes a plurality of pixel portions in an imaging layer, and a circuit layer includes a frame memory that stores a plurality of pieces of data output from the pixel portion. The imaging element and an imaging signal processing circuit are connected by a plurality of lanes, and it is possible to acquire data of still images and moving images by using multi streams and simultaneously store the data. Upon receipt of a capturing instruction in a storage mode of the still images and the moving images, an overall control calculation unit acquires the still image data and the moving image data from the imaging element, and determines a frame to be used for the moving image. The overall control calculation unit performs control in which an image signal of the frame to be used for the moving image before capturing, capturing-in-progress, or after capturing of still image capturing is output to a storage destination.

11 Claims, 14 Drawing Sheets

(51) Int. Cl.
H04N 5/378 (2011.01)
H04N 5/3745 (2011.01)
H04N 5/235 (2006.01)

(56) References Cited

U.S. PATENT DOCUMENTS

| | | | |
|---|---|---|---|
| 2009/0309988 A1* | 12/2009 | Kubo | H04N 5/77 |
| | | | 348/220.1 |
| 2013/0188921 A1* | 7/2013 | Kuriyama | H04N 9/79 |
| | | | 386/225 |
| 2014/0126882 A1 | 5/2014 | Seto et al. | |
| 2018/0103214 A1 | 4/2018 | Ise et al. | |

FOREIGN PATENT DOCUMENTS

| | | |
|---|---|---|
| JP | 2012-175170 A | 9/2012 |
| JP | 2014-120926 A | 6/2014 |
| JP | 2016-144137 A | 8/2016 |
| JP | 2016-187071 A | 10/2016 |
| JP | 2016-225970 A | 12/2016 |
| WO | 2013/145546 A1 | 10/2013 |

* cited by examiner

IMAGING APPARATUS AND CONTROL METHOD THEREOF

BACKGROUND OF THE INVENTION

Field of the Invention

The present invention relates to control in which still image capturing and moving image capturing are simultaneously performed.

Description of the Related Art

In an imaging apparatus that can capture still images and moving images, in general, still images and moving images are captured separately, so a technique that can realize a new image expression by a simple operation is required. Japanese Patent Application Laid-Open No. 2016-144137 discloses a technique that stores still image data after imaging upon receipt of an instruction to capture a still image, and records moving image data that has been imaged before still image data is generated, for a predetermined time as a short movie.

Additionally, Japanese Patent Application Laid-Open No. 2016-225970 discloses an apparatus having a frame memory and a line memory in a circuit layer of an imaging element. The image data in a pixel layer is temporarily stored in a memory, resizing conversion into an optimum image size, partial cutting out and the like, depending on a driving mode, are performed on the image data in the circuit layer, and the data is output.

According to the conventional techniques, since the captured moving image is an image before the still image is captured, it is impossible to store the moving image at the moment when the still image is actually captured and the moving image after the still image capturing is finished.

SUMMARY OF THE INVENTION

The present invention provides an imaging apparatus in which still images and moving images can be captured simultaneously, and there is no temporal dependence of the timing of capturing the moving images with respect to that of capturing the still images.

An imaging apparatus according to one embodiment of the present invention is an imaging apparatus having an imaging unit that outputs data of a plurality of pixel portions by a first stream and a memory unit having a buffer function that stores image signals of a plurality of frames based on the data, the imaging apparatus comprising: an acquisition unit configured to acquire still image data that corresponds to a timing at which an instruction to capture a still image has been provided by a second stream that is different from the first stream in the imaging unit; a determination unit configured to determine a frame to be used for a moving image that corresponds to the timing from the frames stored in the memory unit; and a control unit configured to perform control in which an image signal of the frame to be used for the moving image determined by the determination unit is output to a storage destination.

Further features of the present invention will be described from the following description of the example description with reference to the attached drawings.

DESCRIPTION OF THE EMBODIMENTS

Hereinafter, preferred embodiments of the present invention will be described in detail with reference to the accompanying drawings. In the present embodiment, although an example applied to a digital camera will be described, the present invention is not limited thereto. The present invention can be applied to various devices having an imaging function such as a mobile phone terminal, a portable image display device, a television device including a camera, a digital photo frame, a music player, a game machine, and an electronic book reader.

First Embodiment

Figure 1:
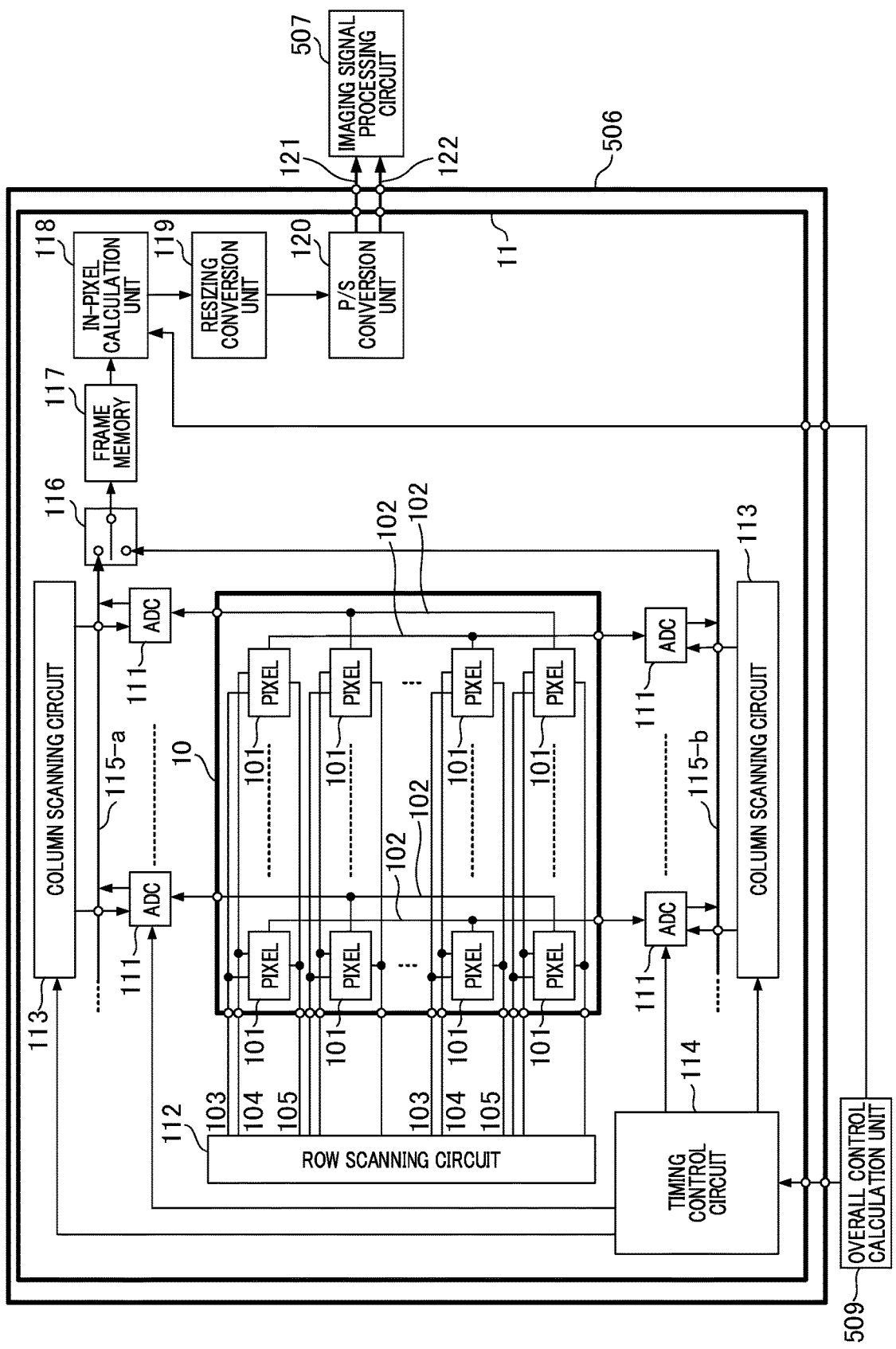
FIG. 1 illustrates a schematic structure of an imaging element according to an embodiment of the present invention.

FIG. 1 is a block diagram illustrating a schematic configuration of an imaging element according to the present embodiment. An imaging element 506 has a configuration in which many pixel portions 101 that configure an imaging unit are arranged in a two-dimensional array. For example, the imaging element 506 having a stacked configuration has a first chip 10 that configures an imaging unit and a second chip 11 that configures a signal processing unit. The imaging element 506 is connected to an imaging signal processing circuit 507 and an overall control calculation unit 509. The imaging signal processing circuit 507 processes an output signal of the imaging element 506. The overall control calculation unit 509 is a central unit that controls the imaging element 506 and another component in the imaging apparatus. In the present embodiment, although the imaging signal processing circuit 507 and the overall control calculation unit 509 have different configurations, the present invention is not limited thereto, and they may be configured on the same circuit including a CPU (central processing unit).

In the first chip 10, a plurality of pixel portions 101 are arranged in a matrix. Each pixel portion 101 is connected to each of transfer signal lines 103, reset signal lines 104, and row selection signal lines 105 in the horizontal direction (row direction). Each of the pixel portions 101 is connected to vertical output lines 102 in the vertical direction (column direction). Note that the vertical output lines 102 respectively have different connection destinations in accordance with the read row units.

The second chip 11 includes pixel drive circuits such as column ADC blocks 111, a row scanning circuit 112, a column scanning circuit 113, and a timing control circuit 114. Additionally, the second chip 11 includes a switching unit 116, a frame memory 117, an in-pixel calculation unit 118, a resizing conversion unit 119, and a parallel/serial conversion unit (hereinafter, referred to as a "P/S conversion unit") 120.

The column ADC blocks 111 performs A/D conversion to a signal that has been output from the vertical output lines 102 connected to the pixel portions 101 to output a digital signal. The row scanning circuit 112 is connected to the pixel portion 101 through the transfer signal lines 103, the reset signal lines 104, and the row selection signal lines 105. The column scanning circuit 113 is connected to the column ADC blocks 111 through horizontal signal lines 115-a and 115-b. The timing control circuit 114 outputs timing control signals to each of the column ADC blocks 111 and the column scanning circuits 113 and performs control.

The switching unit 116 switches the image signals from the horizontal signal lines 115-a and 115-b for each channel, and sequentially outputs the image signals to the frame memory 117. The frame memory 117 acquires the image signals that have been output from the switching unit 116 and temporarily stores the image data. The in-pixel calculation unit 118 reads out the image data from the frame memory 117 and performs resizing and compression calculation in accordance with a drive mode. Note that, in the present embodiment, the switching unit 116 is configured to receive the output of the horizontal signal lines. However, the present invention is not limited thereto, and components following the frame memory 117 may be provided for each output of each horizontal signal line.

The resizing conversion unit 119 performs resizing processing of a necessary angle of view on the image data stored in the frame memory 117 based on the calculated result performed by the in-pixel calculation unit 118. The resizing conversion unit 119 outputs resized image data to a P/S conversion unit 120. The P/S conversion unit 120 performs parallel/serial conversion, and transmits the converted signal to the imaging signal processing circuit 507 that is outside of the imaging element 506. Note that if the resizing processing and the compression processing are unnecessary, the image data is directly transferred from the switching unit 116 to the P/S conversion unit 120.

The imaging element 506 and the imaging signal processing circuit 507 are connected by a plurality of lanes 121 and 122. In the present embodiment, the main lane 121 and the sub lane 122 are shown. Signals of different pixels and signals of the same pixel are divided and transferred to the main lane 121 and the sub lane 122 in accordance with the drive mode, or are transferred only from the main lane.

The imaging element 506 is configured to stack the first chip 10 on the second chip 11. The first chip 10 has the pixel portions 101 arranged in a matrix. The first chip 10 is located on the light incident side, in other words, on the light receiving side of an optical image. Accordingly, a manufacturing process can be divided between an imaging layer and a circuit layer of the imaging element 506 by forming the pixel portions 101 in the first chip 10 and forming, for example, a pixel drive circuit, a memory circuit, and a calculation circuit in the second chip 11. Consequently, thinning of the wiring in the circuit layer, increasing speed, downsizing, and increasing the function by increasing the density can be provided. The specific structure of the imaging element 506 will be described below with reference to FIGS. 3A and 3B.

Figure 2:
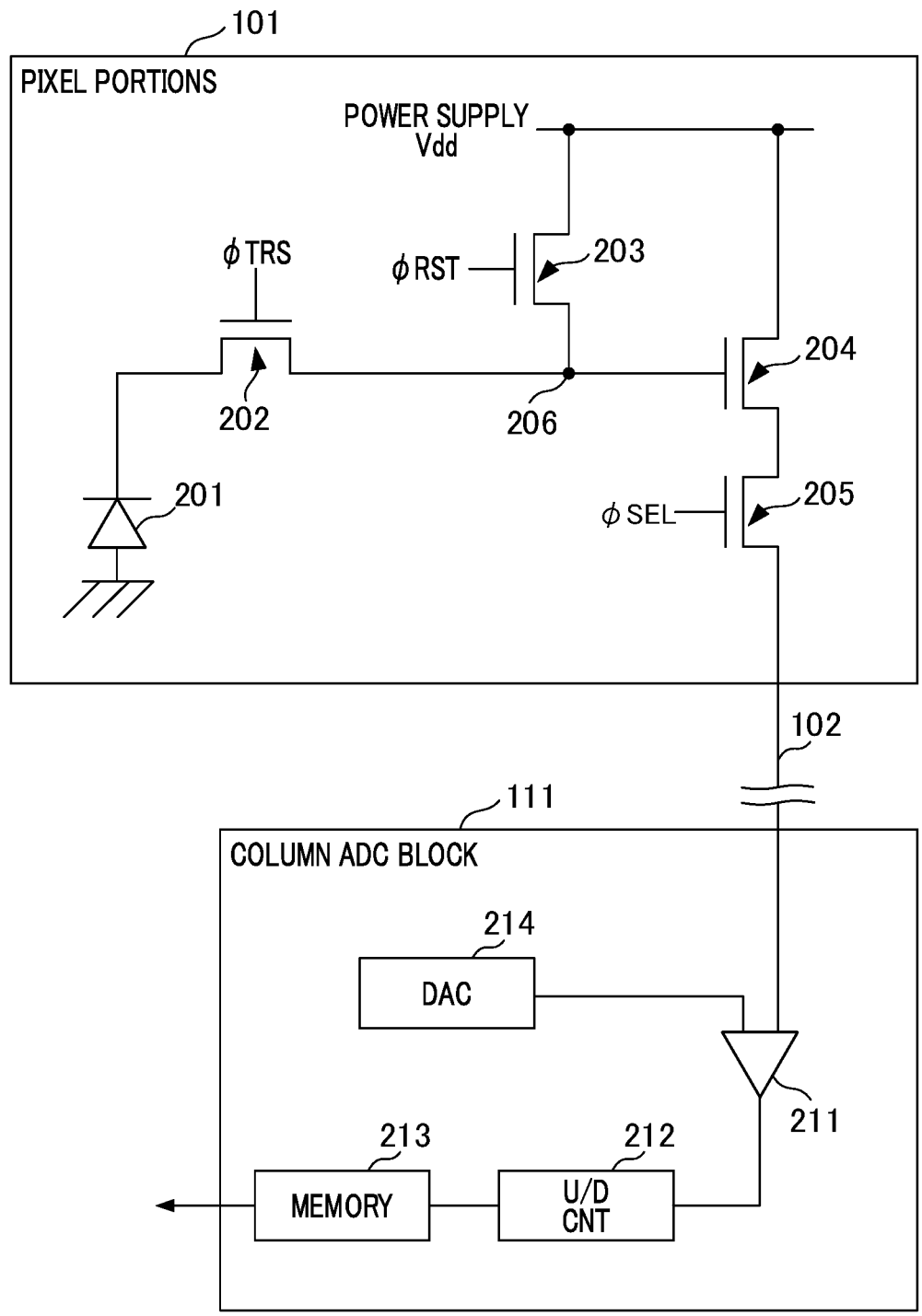
FIG. 2 illustrates a configuration of a pixel portions and column ADC blocks.

FIG. 2 illustrates a detailed configuration of the pixel portions 101 and the column ADC blocks 111 of the imaging element 506. First, the pixel portion 101 will be described. A photodiode (hereinafter, referred to as a "PD") 201 photoelectrically converts light from a received object into charges having a charge amount corresponding to the amount of the light. The anode of the PD 201 is grounded, and the cathode thereof is electrically connected to the gate of an amplifier transistor 204 via a transfer transistor 202. A node electrically connected to the gate of the amplifier transistor 204 configures a floating diffusion unit (hereinafter, referred to as an "FD unit") 206. The transistors 202 to 205 shown in the FIG. 2 are, for example, N-channel MOS (Metal Oxide Semiconductor) transistors.

The transfer transistor 202 is connected between the cathode of the PD 201 and the FD unit 206. The transfer transistor 202 is turned on by applying a transfer pulse φTRS to its gate through the transfer signal lines 103 (see FIG. 1), and the electric charge that has been photoelectrically converted by the PD 201 is transferred to the FD unit 206.

The drain of a reset transistor 203 is connected to a pixel power supply Vdd, and the source thereof is connected to the FD unit 206. The reset transistor 203 is turned on by applying a reset pulse φRST to its gate via the reset signal lines 104 (see FIG. 1). Next, prior to the transfer of a signal charge from the PD 201 to the FD unit 206, the charge of the FD unit 206 is transferred to the pixel power supply Vdd, whereby the FD unit 206 is reset.

The gate of the amplifier transistor 204 is connected to the FD unit 206, and the drain thereof is connected to the pixel power supply Vdd. The potential of the FD unit 206 after resetting by the reset transistor 203 is output as a reset level. The potential of the FD unit 206 after the signal is transferred by the transfer transistor 202 is output as a signal level.

The drain of a selection transistor 205 is, for example, connected to the source of the amplifier transistor 204, and the source thereof is connected to the vertical output lines 102. The selection transistor 205 is turned on by applying the selection pulse φSEL to its gate through the row selection signal lines 105 (see FIG. 1). Next, the signal output from the amplifier transistor 204, in which the pixel portions 101 are in a selected manner, is relayed to the vertical output lines 102. Note that the selection transistor 205 can also have a circuit configuration connected between the pixel power supply Vdd and the drain of the amplifier transistor 204. Additionally, the pixel portions 101 are not limited to the configuration using the four transistors shown in FIG. 2, and the present invention may have a configuration that uses three transistors that use both the amplifier transistor 204 and the selection transistor 205.

The image signal output from the pixel portion 101 through the vertical output lines 102 is transmitted to the column ADC blocks 111. The column ADC blocks 111 include a comparator 211, an up/down counter 212, a memory 213, and a DA converter (hereinafter, referred to as a "DAC") 214.

The comparator 211 has a pair of input terminals. The first input terminal, which is one of the input terminals, is connected to the vertical output lines 102, and the DAC 214 is connected to the second input terminal, which is the other one of the input terminals. The DAC 214 outputs a ramp signal based on a reference signal input from the timing control circuit 114. The ramp signal is a signal for which a level changes with a predetermined tilt as time elapses. The timing control circuit 114 outputs a reference signal to the DAC 214 based on a command from the overall control calculation unit 509.

The comparator 211 compares a level of the ramp signal input from the DAC 214 with a level of the image signal input from the vertical output lines 102, and outputs a comparison signal that represents the comparison result. For example, the comparator 211 outputs a comparison signal having a high (H) level if the level of the image signal is lower than that of the ramp signal. Additionally, if the level of the image signal is higher than that of the ramp signal, the comparator 211 outputs a comparison signal having a low (L) level.

The up/down counter 212 is connected to the output terminal of the comparator 211, and a comparison signal is input thereto. The up/down counter 212 counts, for example, a period of time during which the comparison signal reaches a high level or a period of time during which the comparison signal reaches a low level. By this counting processing, the output signal of each pixel portion 101 is converted into a digital value. Note that an AND (logical product) circuit may be provided between the comparator 211 and the up/down counter 212, a pulse signal may be input to the AND circuit, and the number of pulse signals may be counted by the up/down counter 212.

The memory 213 is connected to the output terminal of the up/down counter 212, and stores a value (count value) counted by the up/down counter 212. Note that the column ADC block 111 counts a first count value corresponding to a reset level based on the image signal during reset of the pixel portions 101. Additionally, the column ADC blocks 111 count a second count value based on the image signal after a predetermined imaging time has passed. The difference value between the first count value and the second count value may be stored in the memory 213. Subsequently, the signal stored in the memory 213 is transmitted to the horizontal signal lines 115-$a$ and 115-$b$ in synchronism with the signal from the column scanning circuit 113.

Figure 3A:
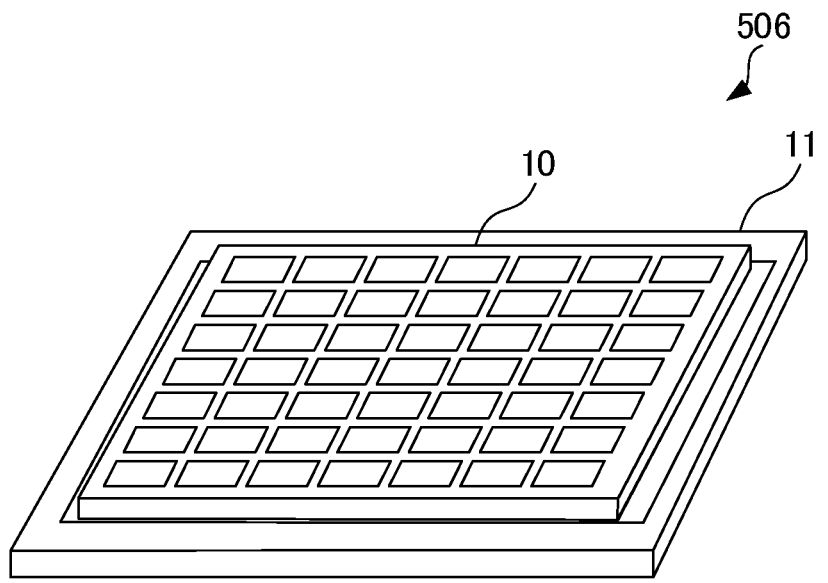
FIGS. 3A and 3B illustrate an example of a structure of the imaging element according to the present embodiment.
Figure 3B:
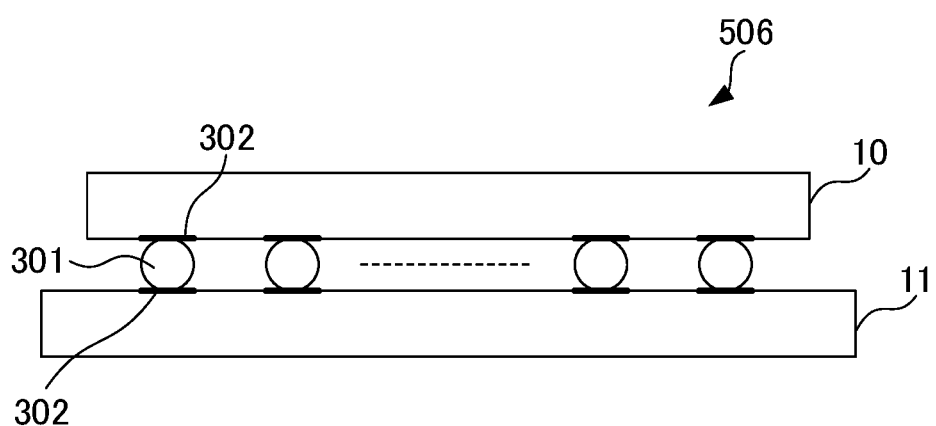

FIGS. 3A and 3B schematically illustrate the configuration of the external appearance of the imaging element 506 according to the present embodiment. FIG. 3A is a perspective view of the imaging element 506 viewed from obliquely above the light incident side. FIG. 3B is a schematic sectional view of the imaging element 506. The first chip 10 forms an imaging layer and the second chip 11 forms a circuit layer. The first chip 10 and the second chip 11 respectively have a plurality of micro pads 302 and are integrated by being electrically connected through a plurality of micro bumps 301.

Figure 4:
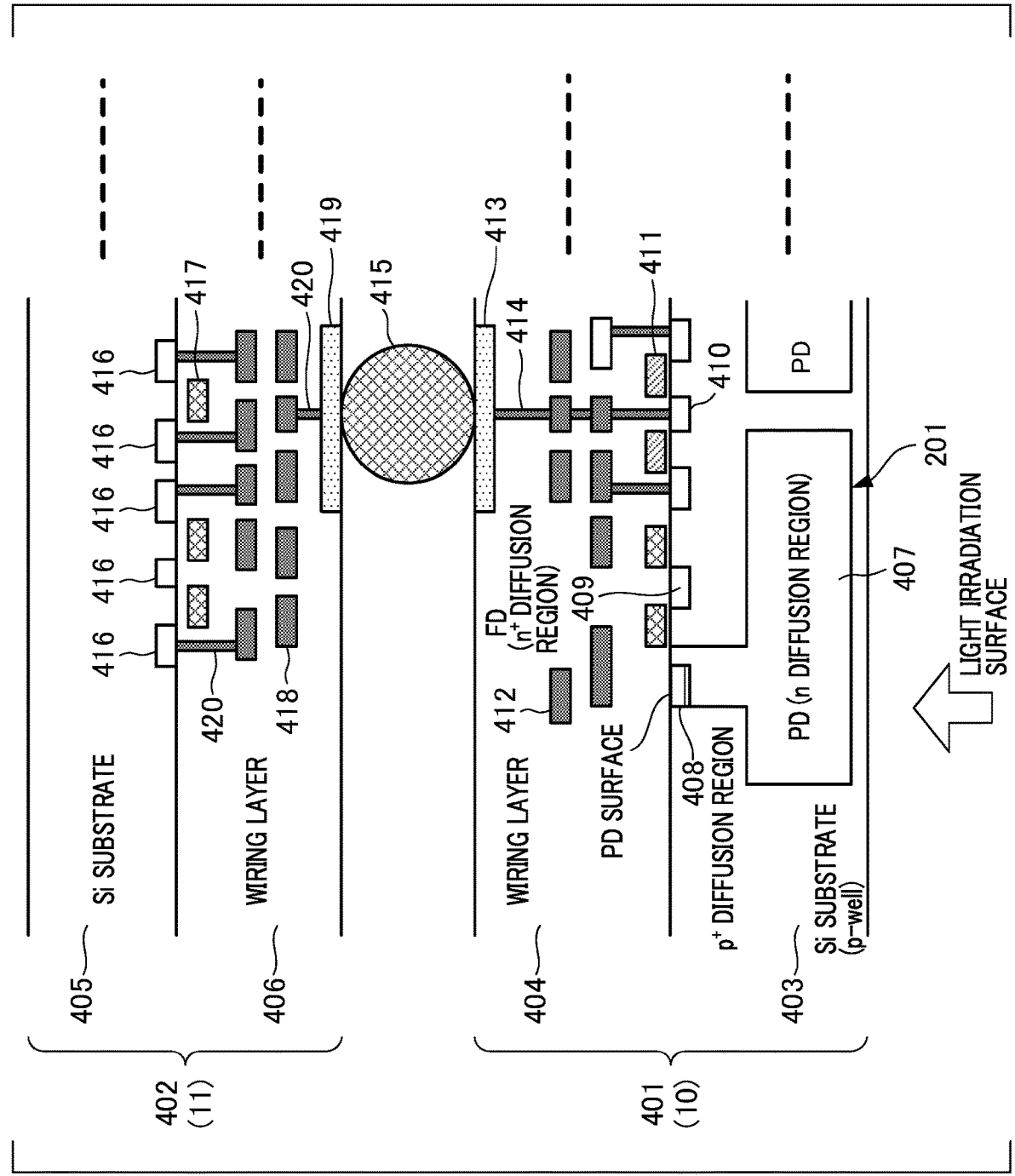
FIG. 4 is a schematic diagram illustrating a cross section of the imaging element according to the present embodiment.

FIG. 4 illustrates details of the cross-sectional structure of the imaging element 506. In FIG. 4, the first chip 10 is shown on the lower side and the second chip 11 is shown on the upper side. Specifically, an imaging layer 401 that configures the imaging unit corresponds to the first chip 10, and a circuit layer 402 corresponds to the second chip 11.

The imaging layer 401 has a configuration in which a wiring layer 404 is formed on a Si (silicon) substrate 403. On the Si substrate 403, an n diffusion region 407 serving as the PD 201 is formed, and has a back-side irradiation structure. A $p^+$ diffusion region 408 is formed in the surface portion of the PD 201, in other words, at the boundary portion with the wiring layer 404. On the surface portion of the Si substrate 403, a plurality of $n^+$ diffusion regions 409 of the FD portion and $n^+$ diffusion regions 410 of the switch transistors are formed.

In the wiring layer 404, a gate wiring 411 of each transistor and a signal transmission wiring 412 are formed in an insulating layer such as $SiO_2$ (silicon dioxide). On the surface portion of the wiring layer 404, a micro pad 413 formed of, for example, Cu, is formed. The transfer transistor 202, the reset transistor 203, the amplifier transistor 204, and the selection transistor 205 are configured by the $n^+$ diffusion region 409, the $n^+$ diffusion regions 410, and the gate wiring 411 of the transistor. In the wiring layer 404, a via 414 for connecting the $n^+$ diffusion regions 410 to the micro pad 413 is formed.

The circuit layer 402 has a configuration in which a wiring layer 406 is formed on a Si substrate 405. A plurality of transistor diffusion regions 416 are formed on the surface portion of the Si substrate 405. In the wiring layer 406, the gate wirings 417 and signal propagation wirings 418 of each transistor are formed in an insulating layer of, for example, $SiO_2$. On the surface portion of the wiring layer 406, a micro pad 419 formed of, for example, Cu, is formed. The micro pad 419 is connected to the micro pad 413 by a micro bump 415. In the wiring layer 406, a via 420 for connecting the transistor diffusion regions 416 and the like to the micro pad 419 is formed. Various circuits are configured by, for example, the transistor diffusion regions 416, the gate wirings 417 of the transistor, and the signal propagation wirings 418. Since details of these are not essential matters relating to the present invention, the explanations will be omitted.

In FIG. 4, although a configuration example in which the imaging layer 401 and the circuit layer 402 are connected by using the micro bump 415 that serves as a stacked connection terminal is illustrated, an embodiment in which the imaging layer 401 and the circuit layer 402 are directly connected with each other without using the micro bump may be used.

Next, with reference to FIG. 5, the imaging system according to the present embodiment will be described. Although a digital camera that acquires moving image data and still image data is shown as an example, the present invention is not limited thereto. For example, the present invention can be applied to, for example, portable devices such as surveillance cameras and smartphones, and in-vehicle cameras.

Figure 5:
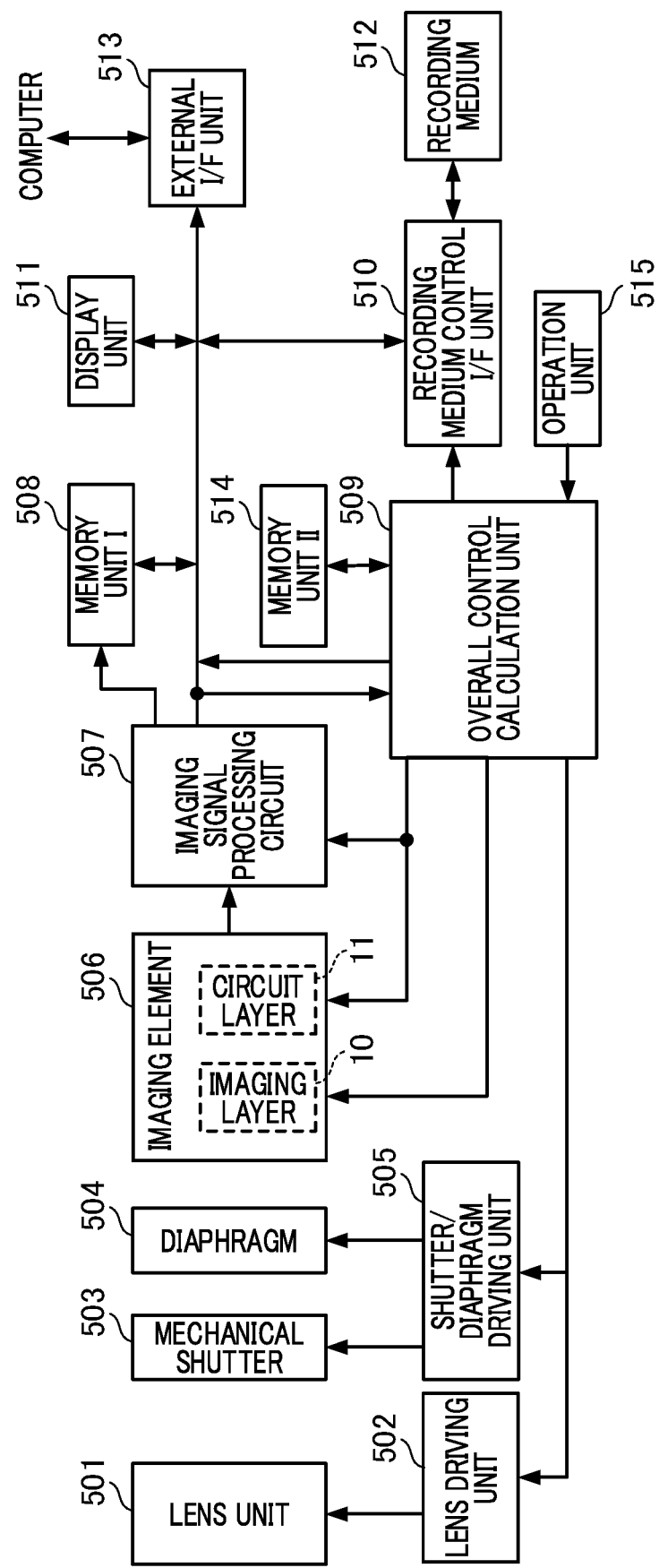
FIG. 5 is a block diagram illustrating an overview of an imaging system according to the present embodiment.

FIG. 5 is a block diagram illustrating the outline of the imaging apparatus using the imaging element 506. A lens unit 501 includes a plurality of lenses that configure an imaging optical system. The lens portion 501 is an interchangeable lens device that can be attached to a camera main body, or a lens unit integrated with the camera main body. A lens driving unit 502 drives a movable lens that configures the imaging optical system. The movable lens is, for example, a zoom lens that performs a magnification operation, a focus lens that performs a focus adjustment operation, and a shift lens for correcting image blur. A mechanical shutter (referred to as a "mechanical shutter" in the drawing) 503 is used for controlling an exposure time, and a diaphragm 504 is used for controlling an exposure amount. A mechanical shutter/diaphragm driving unit (referred to as a "shutter/diaphragm driving unit" in the drawing) 505 drives the mechanical shutter 503 and the diaphragm 504. Note that an optical filter such as an ND (Neutral Density) filter may be provided as a means for controlling the exposure amount.

The imaging element 506 receives light from an object imaged through the imaging optical system, performs photoelectric conversion, and outputs an electric signal. The imaging signal processing circuit 507 processes the output signal from the imaging element 506 and outputs the processed image signal. A first memory unit (referred to as a "memory unit I" in the drawing) 508 has a buffer function and stores, for example, an image signal that has been processed by the imaging signal processing circuit 507.

The overall control calculation unit 509 is a central unit that controls the entire imaging system and includes a CPU (central processing unit). The CPU controls the operation of each unit by executing a program that has been read out from a second memory unit (referred to as a "memory unit II" in the drawing) 514. The second memory unit 514 stores the calculation result of the CPU and the camera information set in the imaging apparatus by the user's operation, in addition to the program. A recording medium control interface (I/F) unit 510 performs a process that records, for example, image signals on a recording medium 512 and reads out information from the recording medium 512 in accordance with a control instruction of the overall control calculation unit 509. The recording medium 512 can be attached to and detached from the main body of the imaging apparatus. A display unit 511 includes a display device such as a liquid crystal display panel and displays, for example, image data on the screen in accordance with the control instruction from the overall control calculation unit 509. An external interface (I/F) unit 513 is a communication processing unit that transmits and receives information to and from an external device such as a computer by using wired or wireless communication. An operation unit 515 includes an input device such as a switch and a touch panel, and receives an operation instruction from a user and outputs an operation instruction signal to the overall control calculation unit 509. Information about, for example, driving conditions of the imaging apparatus set through the operation unit 515 by the user's operation is transferred to the overall control calculation unit 509, and the imaging apparatus is entirely controlled based on the information. The overall control calculation unit 509 outputs a control signal for controlling each component of the imaging element 506 to the in-pixel calculation unit 118 in the imaging element 506, and performs control. The control signal includes, for example, an imaging synchronization signal, driving mode setting, and exposure setting information.

Figure 13:
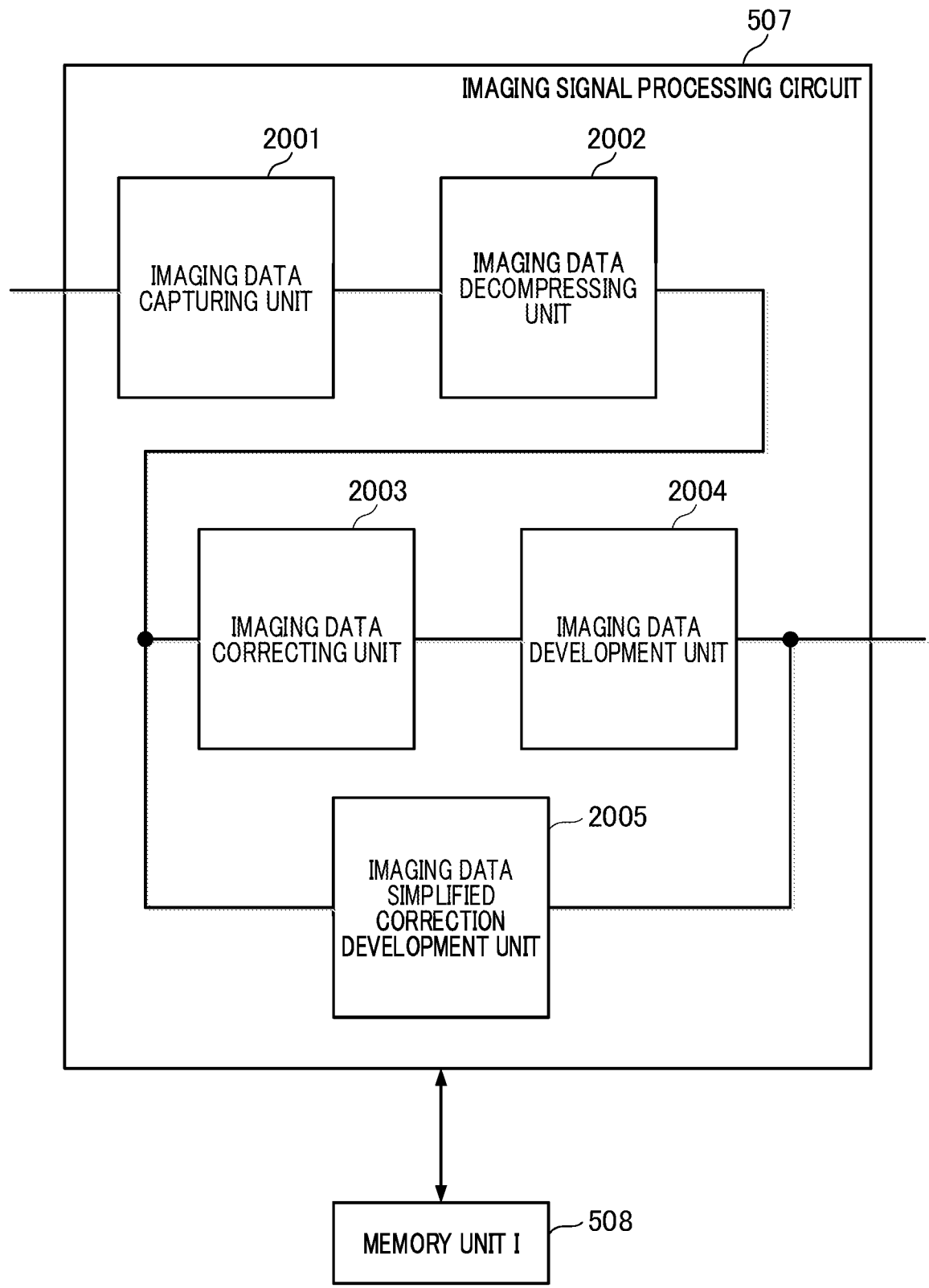
FIG. 13 is a schematic diagram illustrating a configuration of an imaging signal processing circuit according to the present embodiment.

Light from the object that has passed through the lens unit 501 is adjusted to an appropriate light amount by the diaphragm 504, and is imaged on the imaging plane of the imaging element 506. A photoelectric conversion unit that configures the pixel portions 101 of the imaging element 506 performs photoelectric conversion on the optical image of the object and outputs an electric signal. Gain control is further performed to the electric signal, A/D conversion is performed to convert an analog signal to a digital signal, and then the digital signal is transferred to the imaging signal processing circuit 507. The imaging signal processing circuit 507 will be described in detail with reference to FIG. 13. FIG. 13 is a block diagram that illustrates a configuration example of the imaging signal processing circuit 507. The imaging element 506 and the imaging signal processing circuit 507 are connected with several lanes. The imaging data captured by an imaging data capturing unit 2001 is converted into R, Gr, Gb, and B signals. If the compression processing is performed to the imaging data in the in-pixel calculation unit 118 of the imaging element 506, an imaging data decompression unit 2002 performs the decompression processing of the R, Gr, Gb, and B signals. Subsequently, an imaging data correcting unit 2003 corrects the imaging data. This correction includes variance correction of the column ADC block in the imaging element 506, correction of defect data of the imaging element 506, and correction of a light amount of the lens unit 501. An imaging data development unit 2004 acquires the corrected data, performs a variety of development processing such as low-pass filter processing that reduces noise, white balance processing, and performs, for example, coding compression of the image signal. A simplified correction development unit 2005 of the imaging data acquires the output of the imaging data decompressing unit 2002, and separately from the imaging data correcting unit 2003 and the imaging data development unit 2004, the simplified correction development unit 2005 performs simple correction for performing a live view display on the display unit 511, and performs development. As a result, live view display can be performed simultaneously with correction and development of still images and moving images. Of course, more detailed live view display can be performed by using the imaging data correcting unit 2003 and the imaging data development unit 2004 of the normal processing system. Note that the imaging signal processing circuit 507 can directly access the first memory unit 508. Additionally, it is possible to temporarily store the data in the first memory unit 508 from any of the units 2001 to 2005 in FIG. 13, and possible to delay the processing timing, and the like.

Control such as zoom driving and focus driving is performed on the lens unit 501 by the lens driving unit 502. The mechanical shutter 503 and the diaphragm 504 are each driven by the mechanical shutter/diaphragm driving unit 505 in accordance with a control command from the overall control calculation unit 509. The overall control calculation unit 509 performs control of the entire imaging apparatus and various calculations. The first memory unit 508 temporarily stores the image signal after imaging. The recording medium control I/F unit 510 performs a process that records image signals on the recording medium 512. The display unit 511 displays the captured image on the screen. Note that in the present embodiment, although the recording medium 512 is configured so as to be provided in the imaging system, the present invention is not limited thereto. With respect to the data storage destination or the data output destination, for example, the image signal may be output to an external device via the external interface (I/F) unit 513. Additionally, although the external device may be, for example, a personal computer and a smartphone directly connected to the imaging apparatus, the external device may be a plurality of devices such as a cloud server connected through a network.

Figure 6:
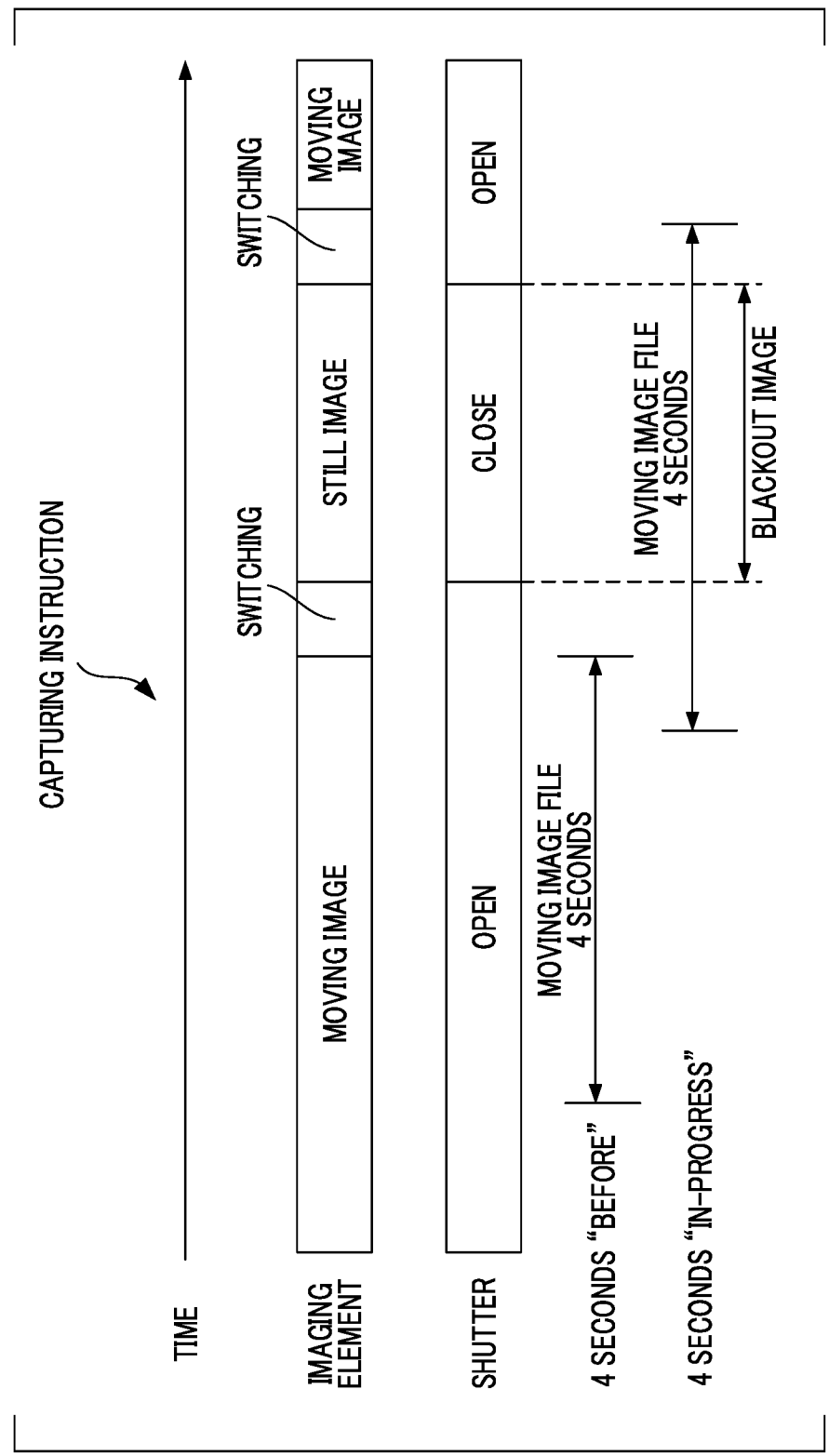
FIG. 6 is timing chart that explains a comparative example.

A comparative example will be described with reference to FIG. 6. Hereinafter, in the imaging apparatus, a function of storing moving image data for a predetermined time during still image capturing is referred to as the "PMA mode". FIG. 6 illustrates a state transition of the imaging element 506 and the mechanical shutter 503 in the PMA mode. The direction of the time axis is set as the direction of an arrow in FIG. 6 (left to right direction), and the timing of the capturing instruction by the user is shown. Each state of the moving image mode and the still image mode and the switching state of the mode are shown as the state of the imaging element 506. OPEN (open state) and CLOSE (closed state) are shown as states of the mechanical shutter 503.

In FIG. 6, the imaging element 506 in the moving image mode is in the imaging state of the moving image, and the mechanical shutter 503 at this time is in the open state. The comparative example illustrates a state in which moving image data for 4 seconds before capturing instruction is stored as a moving image file. If a capturing instruction is provided from the user, the mode of the imaging element 506 is changed to the still image mode. Accordingly, the mechanical shutter 503 becomes a closed state, and still image capturing is performed. After the still image capturing ends, the mode of the imaging element 506 returns to the moving image mode again, and the mechanical shutter 503 becomes an open state. In case of storing moving image data during a period of time for capturing the still image, an inconvenience occurs in which there is a period of time for mode change in order for the mode of the imaging element 506 to be in the still image mode, the mode to be shifted is the still image mode, and the like. An inconvenience occurs in which data of a dark moving image is obtained even if the moving image data is stored because the mechanical shutter 503 closes in the still image mode.

In the present embodiment, the inconvenience in the above PMA mode is solved by simultaneously outputting data for a moving image and data for a still image by an imaging element in which an imaging layer and a circuit layer are stacked. Hereinafter, the drive mode of the imaging element for realizing simultaneous output of each data of the moving image and the still image is referred to as "a moving image and a still image mode".

Figure 7:
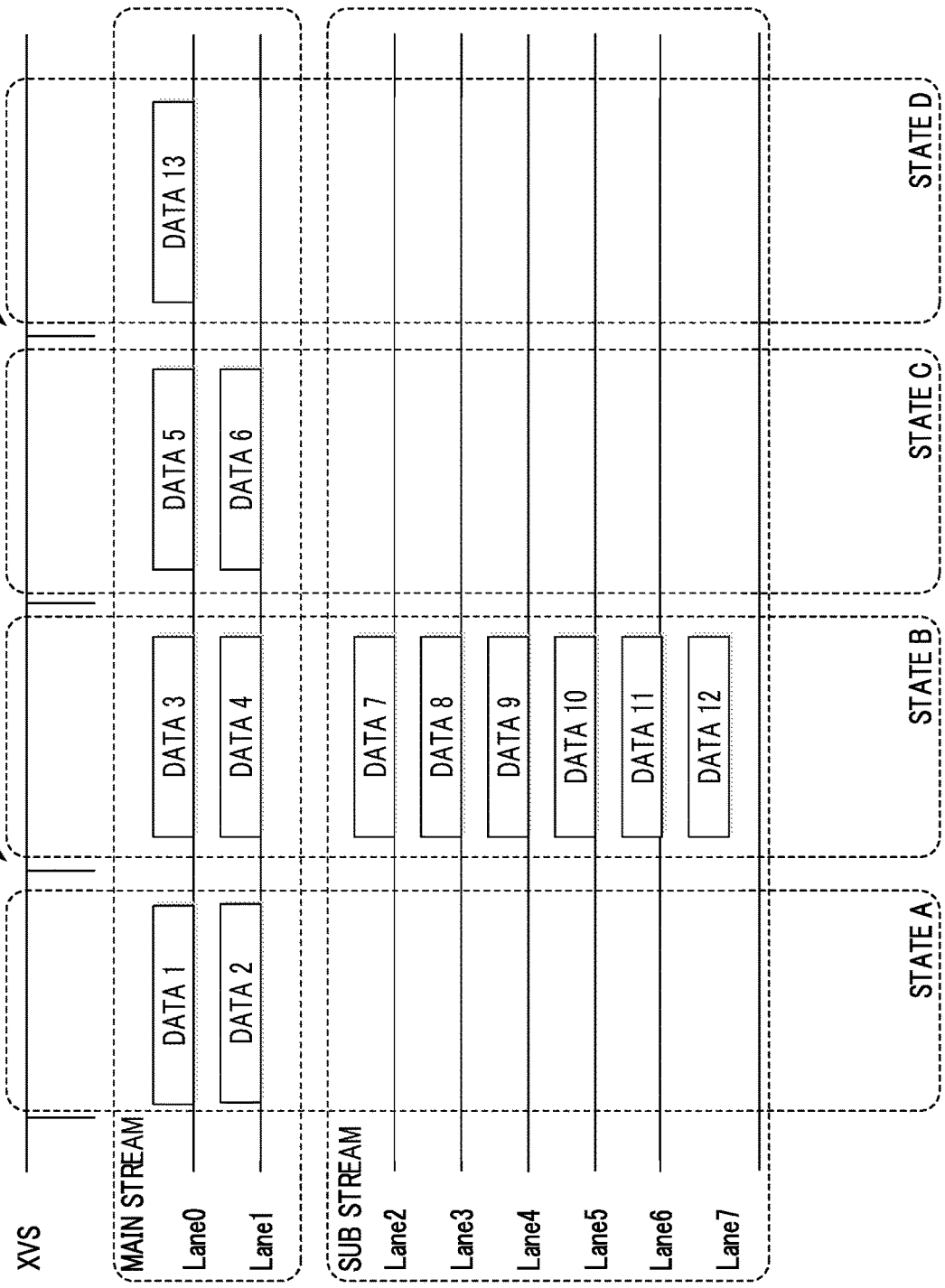
FIG. 7 illustrates the output timing of the imaging element according to the present embodiment.

FIG. 7 is a timing chart illustrating an operation example of the imaging element 506 in the moving image and still image mode. XVS is a vertical synchronizing signal input from the overall control calculation unit 509 to the imaging element 506. The imaging element 506 and the imaging signal processing circuit 507 are connected by eight output lines (Lanes 0-7) from the imaging element 506 to the imaging signal processing circuit 507. For the main stream in the main lane 121, two output lines of Lane 0 and Lane 1 are used. For the sub stream in the sub lane 122, six output lines from Lane 2 to Lane 7 are used. FIG. 7 illustrates four operation states (states A to D).

If the imaging apparatus enters the PMA mode, in the moving image and still image mode of the imaging element 506, only two lanes, Lane 0 and Lane 1 of the main stream, are normally operating. Frame data (see data 1 and data 2) is output from these two lanes (state A). The data output here is data for moving images, and a pixel value acquired by addition thinning of the output of the still image pixels is output. The pixel output performed by addition thinning will be described below with reference to FIG. 8.

If an instruction to capture a still image is provided to the imaging apparatus, the sub stream operates (state B) simultaneously with the main stream of the imaging element 506 that remains operated (see data 3 and data 4). Pixels for still images, in other words, all pixels, are output from the sub stream. In this case, in the internal operation of the imaging element 506, signals are read out from all pixels (see data 7 to data 12) and are stored in the frame memory 117. For the main stream, addition thinning is partially performed on the pixel signals of all pixels by the in-pixel calculation unit 118, compression is performed to reduce the amount of data, and the signals are output. The data of the dark moving image shown in the comparative example (see FIG. 6) is not obtained. In contrast, for the sub stream, the in-pixel calculation unit 118 compresses the pixel signals of all pixels and then outputs them. After the signal readout for one frame of the still image has been completed, the operation of the sub stream stops. In this case, the state returns to a state in which only the main stream (see data 5 and data 6) operates (state C). In the process that decompresses the compressed still image data, the mode of the imaging signal processing circuit 507 is temporarily changed to the uncompressed addition mode (state D). That is, the mode is switched so as to be in a state in which only the main stream (see data 13) operates, where the moving image data cannot be acquired in this case. Note that a signal acquired by adding signals of the frames may be used for pixel signals of all pixels output to the sub stream.

Figure 8:
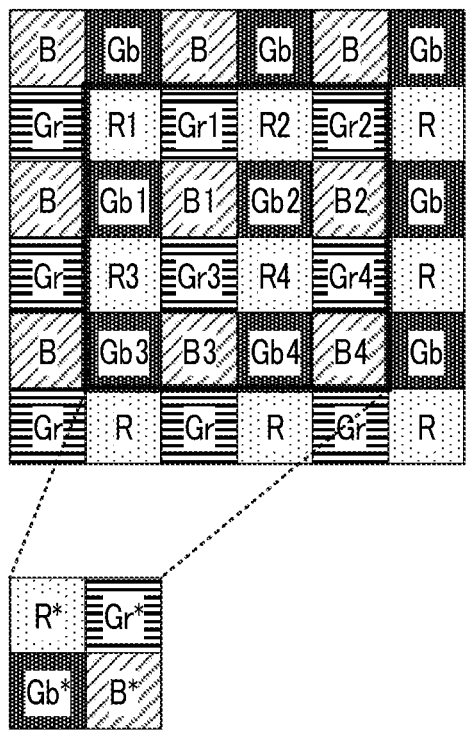
FIG. 8 is an explanatory diagram of a pixel output pattern of the imaging element according to the present embodiment.

With reference to FIG. 8, the addition thinning processing described. FIG. 8 is a pixel diagram that schematically illustrates the addition thinning processing. In the pixel group of the Bayer array, each of R, Gr, Gb and B represents a color of the color filter. The pixel values of 4 pixels in the horizontal direction and the vertical direction are denoted by "Gr", "Grj", "Gbj", and "Bj" (where j=1 to 4), and the pixel values thereof after the calculation are denoted by "R*", "Gr*", "Gb*", and "B*". The addition thinning processing is performed by using the following formula.

$$R^* = \frac{3 \times R1 + R2 + L1.5 \times R3 + 0.5 \times R4}{6}$$ [Formula 1]

$$Gr^* = \frac{Gr1 + 3 \times Gr2 + 0.5 \times Gr3 + 1.5 \times Gr4}{6}$$

$$Gb^* = \frac{1.5 \times Gb1 + 0.5 \times Gb2 + 3 \times Gb3 + Gb4}{6}$$

$$B^* = \frac{0.5 \times B1 + 1.5 \times B2 + B3 + 3 \times B4}{6}$$

The sum of the coefficient values that are used in the weighted addition processing is 6, and 4 pixels of the pixel value acquired by the addition thinning processing that has been performed at each ratio, is output. In this example, 16 pixels are thinned out to 4 pixels.

Figure 9:
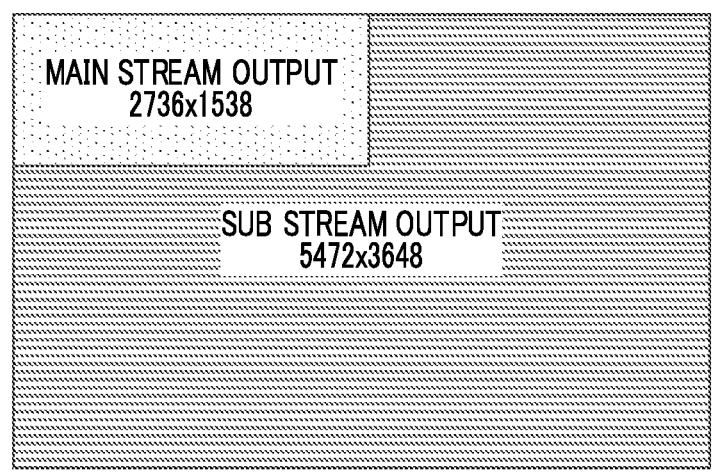
FIG. 9 is an explanatory diagram of a pixel output size of the imaging element according to the present embodiment.

FIG. 9 is a schematic diagram illustrating an example of the main stream output and the sub stream output. The main stream output is a pixel output of 2736 pixels in the horizontal direction and 1538 pixels in the vertical direction. The sub stream output is a pixel output of 5472 pixels in the horizontal direction and 3648 pixels in the vertical direction. Upon moving image capturing, the pixel output is less than ¼ by performing addition thinning processing on the pixel output of 5472 pixels in the horizontal direction and 3648 pixels in the vertical direction upon still image capturing. Specifically, the pixel output is reduced to a data amount of 2736 pixels in the horizontal direction, which becomes one-half by performing the addition thinning processing, and is reduced to a data amount of 1538 pixels in the vertical direction, which becomes one-half by performing the addition thinning processing and cutting out the top and bottom, and the moving image data is output. That is, the moving image data is lower in resolution or has less pixels than the still image data.

Figure 14:
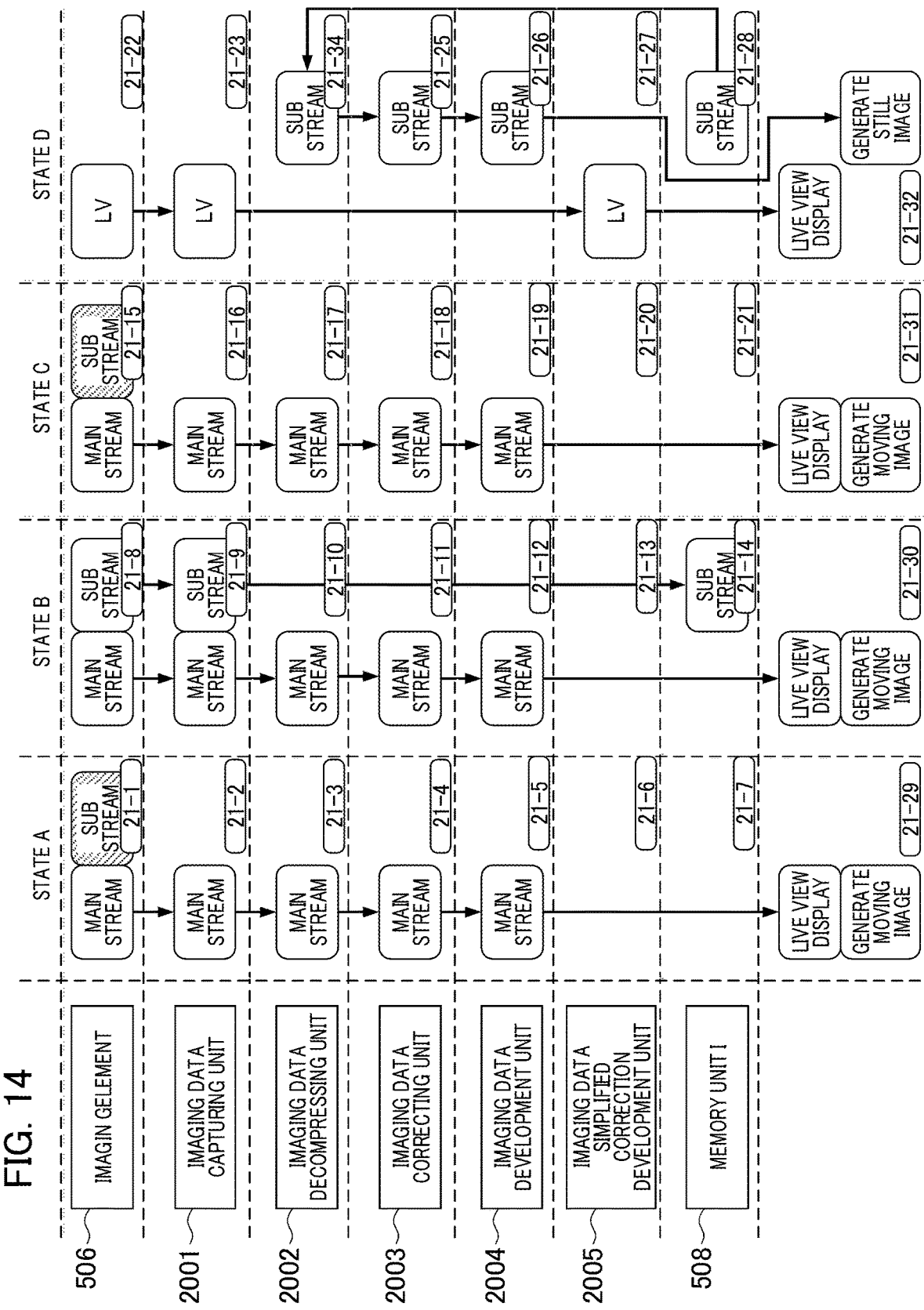
FIG. 14 is a state transition diagram illustrating a process of the imaging signal processing circuit according to the present embodiment.

Processing such as decompression, correction, and development is performed by the image signal processing circuit 507 on the moving image data of the main stream output, and is stored as a moving image file in the recording medium 512 via the recording medium control I/F unit 510. With reference to FIG. 14, the operation of the imaging signal processing circuit 507 will be described together with states A to D shown in FIG. 7. Although the imaging signal processing circuit 507 does not perform the decompressing processing of the main stream and the sub stream simultaneously, it is configured to enable simultaneously executing correction and development if they are simple processing.

The process in the state A is shown from "21-1" to "21-7", and "21-29" in FIG. 14. Only the compressed moving image data is output from the main stream of the imaging element 506, and the sub stream is not in operation (21-1). The output moving image data is converted into an RGB signal by the imaging data capturing unit 2001 (21-2), and then decompression processing is performed on the moving image data by the imaging data decompression unit 2002 (21-3). Subsequently, the imaging data correcting unit 2003 performs a variety of correction processing on the data (21-4), and development processing is performed on the data by the imaging data development unit 2004 so as to use the data as a moving image file and a display image for live view (21-5). The processed data is stored in the recording medium 512 as a moving image file, and live view display is performed on the screen of the display unit 511 (21-29).

The process in the state B is shown from "21-8" to "21-14", and "21-30" in FIG. 14. The moving image data compressed from the main stream of the imaging element 506 and the still image data compressed from the sub stream are output. That is, both streams are in operation (21-8). The moving image data that has been output from the main stream is converted into an RGB signal by the imaging data capturing unit 2001 (21-9), and then decompression processing is performed by the imaging data decompression unit 2002 (21-10). Subsequently, the imaging data correcting unit 2003 performs a variety of correction processing on the data (21-11), and the imaging data development unit 2004 performs development processing to be used for moving image file and a display image for live view (21-12). The processed data is stored in the recording medium 512 as a moving image file and live view display is performed on the screen of the display unit 511 (21-30). In contrast, the still image data that has been output from the sub stream is converted into the RGB signal (21-9) simultaneously with the conversion of the moving image data by the imaging data capturing unit 2001 and is stored in the first memory unit 508 as it is (21-14). Note that in the state B, the moving image data output from the main stream and the still image data output from the sub stream include signals from pixels at the same timing. Specifically, the frames output from both streams include a frame in which an exposure period of time overlaps. A part of the exposure period of time of the frame used for the moving image overlaps the exposure period of time of the frame used for the still image that corresponds to the timing at which an instruction to capture still images has been provided.

Since the process of the imaging signal processing circuit 507 in the state C is the same as that in the state A as shown in "21-15" to "21-21", and "21-31" in FIG. 14, the description will be omitted.

The process in the state D is shown in "21-22" to "21-28", "21-32", and "21-34" in FIG. 14. The operation of the imaging element 506 is an operation in a single stream mode in which only the main stream can operate instead of an operation in a multi-stream mode in which both of the main stream and the sub stream operate. The operation is performed in a mode in which an uncompressed live view image can be acquired from the imaging element 506 (21-22). The output live view image data is converted into an RGB signal (21-23) by the imaging data capturing unit 2001 and is transferred to the simplified correction development unit 2005. The simplified correction development unit 2005 performs a variety of correction processing and development processing (21-27), and live view display is performed on the screen of the display unit 511 (21-32). In contrast, the still image data (21-28) stored in the first memory unit 508 in the state B is transferred to the imaging data decompression unit 2002 and the decompression processing is performed (21-34). Subsequently, the imaging data correcting unit 2003 performs a variety of correction processing (21-25), and the imaging data development unit 2004 performs development processing as a still picture file (21-26). The data to which development has been performed is stored on the recording medium 512 as a still image file (21-32).

Figure 10:
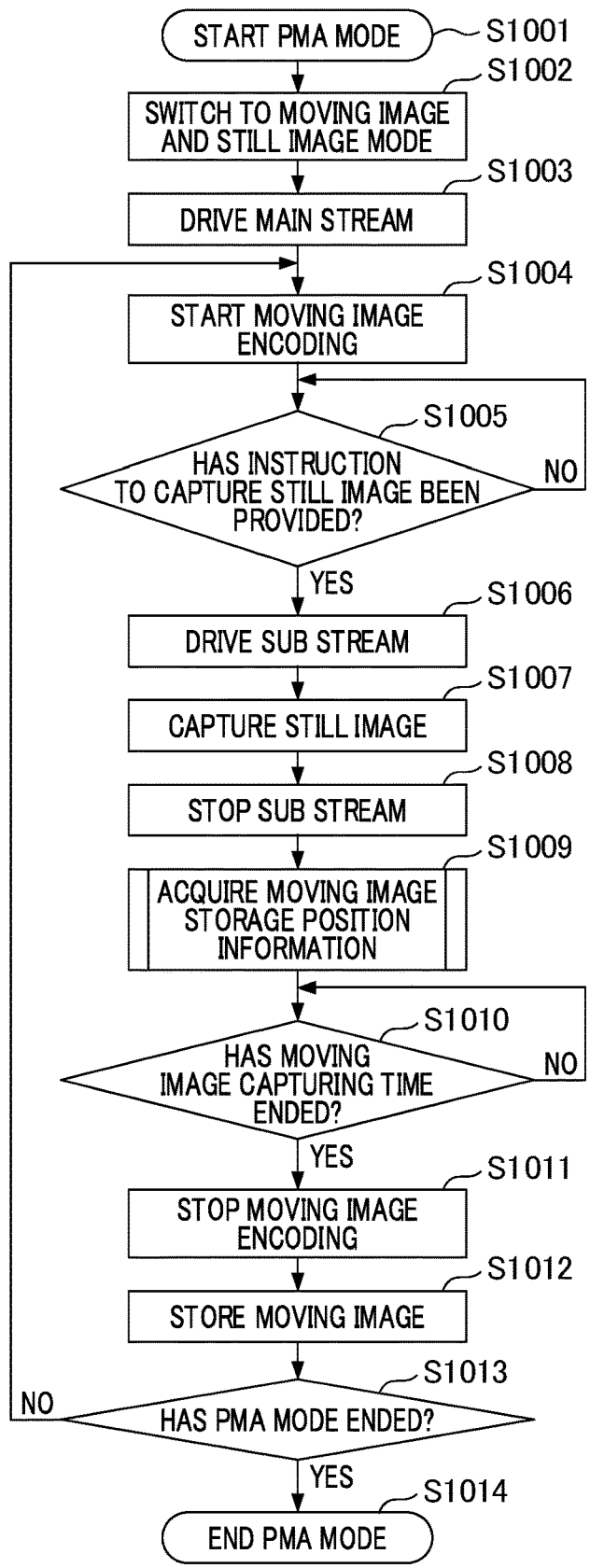
FIG. 10 is a flowchart that illustrates a process example according to the present embodiment.

With reference to FIG. 10, a process in the present embodiment will be described. FIG. 10 is a flowchart illustrating a process example. When the PMA mode is selected in step S1001, the process starts. In step S1002, the overall control calculation unit 509 switches the drive mode of the imaging element 506 to the moving image and still image mode. In the next step S1003, the overall control calculation unit 509 executes a process that drives only the main stream. When the main stream is driven, moving image encoding starts (S1004).

In step S1005, the overall control calculation unit 509 determines whether or not an instruction to capture a still image has been provided by the user's operation. If it is determined that an instruction to capture a still image has been provided, the process proceeds to step S1006. If it is determined that an instruction to capture a still image has not been provided, the determination processing of step S1005 is repeated to wait until the instruction to capture a still image is provided. In step S1006, the overall control calculation unit 509 performs a process that drives the sub stream of the imaging element 506, and in the next step S1007, a still image is captured. After capturing a still image, the sub stream immediately stops (S1008). After capturing is completed, in step S1009, the overall control calculation unit 509 acquires moving image storage position information. Note that the moving image storage position is a position indicating a storage timing of a moving image corresponding to an instruction to capture a still image, which corresponds to which frame is to be set as a start frame with respect to a plurality of moving image frames that has been acquired in the main stream. More specifically, the moving image storage position may use the instruction to capture a still image as the reference, or it may be determined based on the timing of acquiring "I frame" with the "I frame" closest to the instruction as the reference. The moving image storage position information is information indicating the position in the case of outputting an image signal of the moving image and storing it in, for example, a storage medium, which is a storage destination. The acquisition process will be described below with reference to FIGS. 11 and 12.

In step S1010, the overall control calculation unit 509 determines whether or not the moving image capturing time has completed based on the moving image storage position information that has been acquired in step S1009. If the moving image capturing time has completed, the process proceeds to S1011, and if the moving image capturing time has not completed, the determination process of step S1010 is repeatedly executed. In step S1011, the moving image encoding stops, and in step S1012, the overall control calculation unit 509 performs a process that stores the moving image data in the recording medium 512.

In step S1013, the overall control calculation unit 509 determines whether or not the PMA mode of the imaging apparatus has ended. If the PMA mode has not ended, the process returns to step S1004 and the moving image encoding starts again. If the PMA mode ends, the process ends in step S1014.

Figure 11:
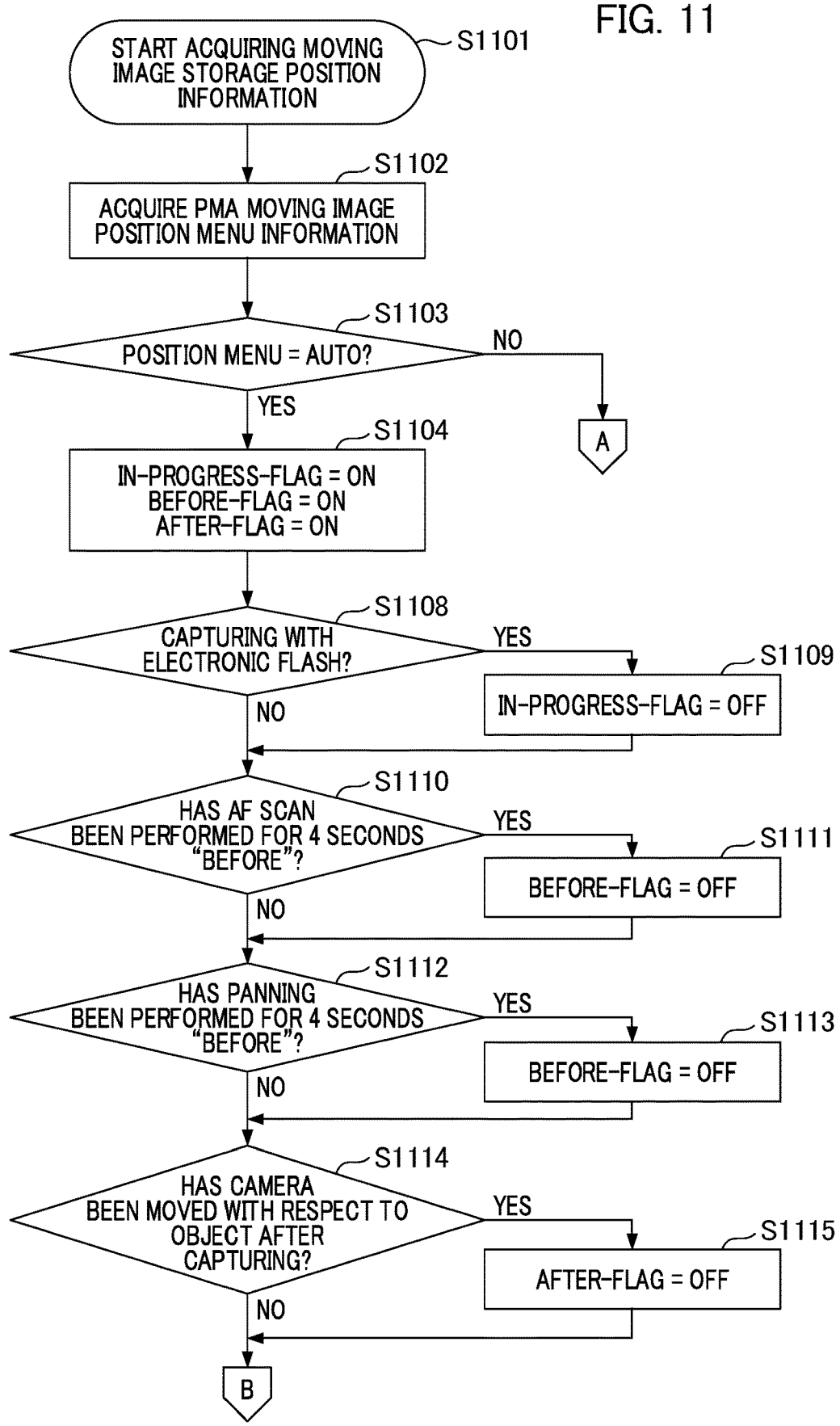
FIG. 11 is a flowchart illustrating acquisition processing of moving image storage position information.
Figure 12:
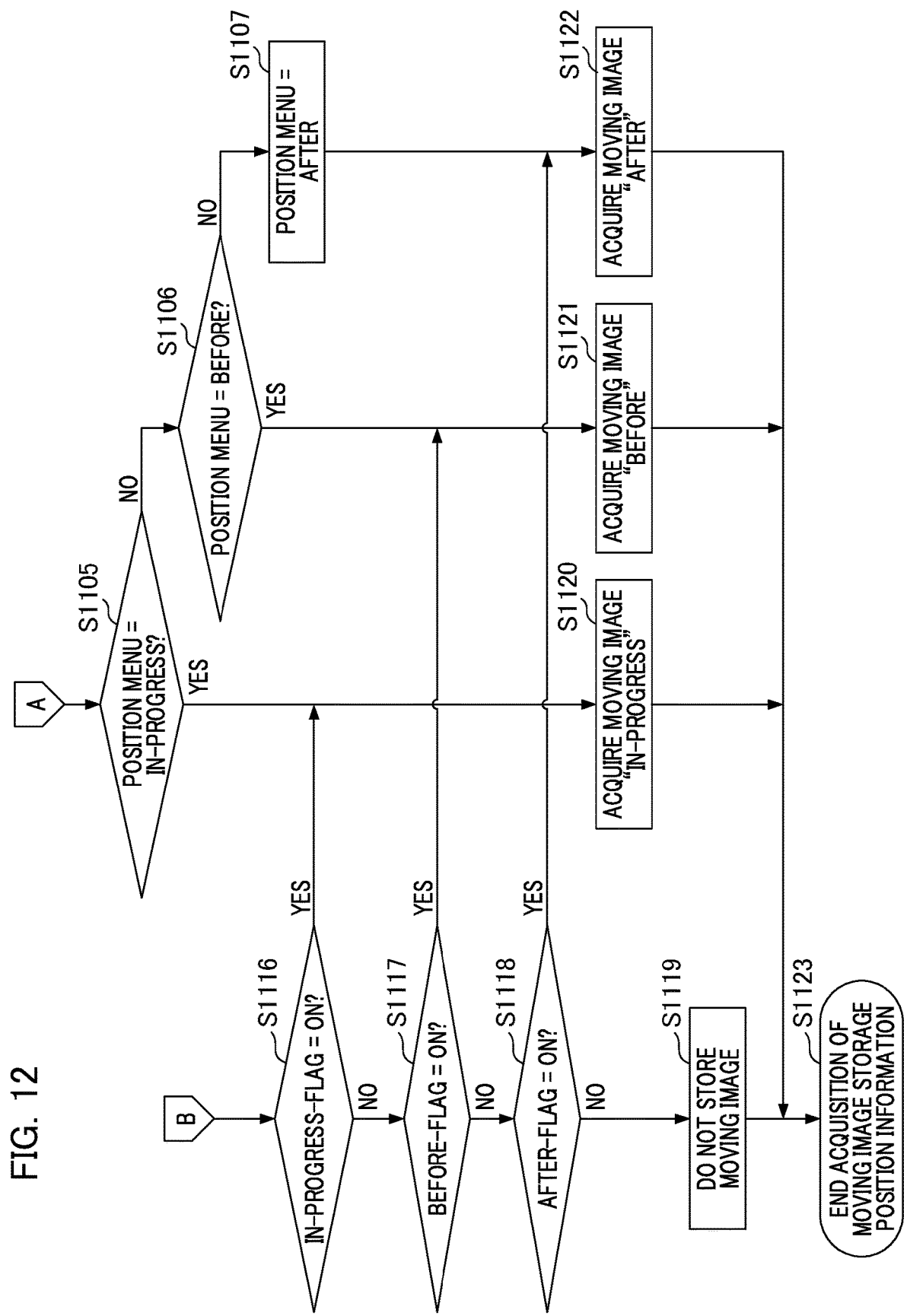
FIG. 12 is a flowchart that illustrates a process following FIG. 11.

With reference to FIG. 11 and FIG. 12, step S1009 (acquisition of moving image storage position information) in FIG. 10 will be described. FIG. 11 and FIG. 12 are flowcharts illustrating a process that determines at which point in time the moving image data is to be stored with respect to still image capturing. In the process, it is determined whether or not the moving image data before still image capturing is to be stored, whether or not the moving image data during the period of time including the time of the still image capturing is to be stored, or whether or not the moving image data after the still image capturing is to be stored.

In step S1101, an acquisition process of the moving image storage position information starts. In step S1102, the overall control calculation unit 509 acquires the setting information of the storage position of the moving image data on the menu screen. The user can set the storage position of the moving image data in the PMA mode in advance by displaying the menu screen by using the display unit 511 and the operation unit 515. In the present embodiment, the storage position of the moving image data is a position that corresponds to the timing of storing the captured moving image data on the recording medium. In the present embodiment, an example in which the user can select "before" (before capturing), "in-progress" (capturing-in-progress), "after" (after capturing), and "AUTO" (automatic setting) is illustrated. The display unit 511 displays options related to the storage position of the moving image data on the menu screen, and the storage process of the moving image data is performed in accordance with the setting information instructed by the user's operation. If "AUTO", which is one of the options, is selected, the imaging apparatus automatically determines the storage position of the moving image data based on a various types of information. The setting information is stored in the second memory unit 514.

In step S1103, the overall control calculation unit 509 determines whether or not the setting information that has been selected on the menu screen is "AUTO". If "AUTO" is selected, the process proceeds to step S1104, and if any other than "AUTO" is selected, in other words, if "before", "in-progress", or "after" is selected, the process proceeds to step S1105 in FIG. 12.

In step S1104, the overall control calculation unit 509 performs flag setting. All of an in-progress-flag, a before-flag, and an after-flag are set to ON. The situation in which these flags are set to OFF means that moving image data is not to remain. For example, if the in-progress-flag that corresponds to capturing-in-progress of the still image is set to OFF, it is determined that the moving image data during the still image capturing is not to remain. This also applies to the before-flag that corresponds to before still image capturing and the after-flag that corresponds to after still image capturing.

In step S1108, the overall control calculating unit 509 determines whether or not an electronic flash emission has been performed during still image capturing. If it is determined that the electronic flash emission has been performed (in a capturing mode with electronic flash), the process proceeds to step S1109, and if it is determined that the electronic flash emission has not been performed, the process proceeds to step S1110. In step S1109, the overall control calculation unit 509 sets the in-progress-flag to "OFF", and the process proceeds to step S1110.

In step S1110, the overall control calculation unit 509 determines whether or not AF (automatic focus adjustment) scanning has been performed for 4 seconds before the point in time the still image is captured. The AF scan is a search operation that drives a focus lens in order to focus on an object. If it is determined that the AF scan has been performed for the focus adjustment operation for 4 seconds before the point in time that the still image is captured, the process proceeds to step S1111, and if it is determined that the AF scan has not been performed, the process proceeds to step S1112. In step S1111, the overall control calculation unit 509 sets the before-flag to OFF, and the process proceeds to step S1112.

In step S1112, the overall control calculation unit 509 determines whether or not panning operation of the imaging apparatus has been performed for 4 seconds before the point in time that the still image is captured, in other words, determines whether or not the imaging apparatus has moved significantly. The panning determination process is performed by using the output of the shake detection unit such as an angular velocity sensor and an acceleration sensor provided in the imaging apparatus. For example, if the state in which the shake amount (movement amount) of the imaging apparatus is equal to or larger than a threshold continues for a predetermined threshold time, it is determined that panning has been performed. If it is determined that panning operation of the imaging apparatus has been performed for 4 seconds before the point in time the still image is captured, the process proceeds to step S1113, and if it is determined that panning operation has not been performed, the process proceeds to step S1114. In step S1113, the overall control calculation unit 509 sets the before-flag to OFF, and the process proceeds to step S1114.

In step S1114, the overall control calculation unit 509 determines whether or not the imaging apparatus has moved significantly with respect to the object after the still imaging has been completed, based on the captured image data. The amount of motion at this time can be calculated based on the motion vector of the captured image and the calculated motion vector is compared with a threshold. If it is determined that the imaging apparatus has moved significantly after the still image capturing has been completed, in other words, if it is determined that the motion vector is larger than the threshold, the process proceeds to step S1115. Additionally, if it is determined that the imaging apparatus has not moved significantly after the still image capturing has been completed, in other words, if it is determined that the motion vector is equal to or less than the threshold, the process proceeds to step S1116 in FIG. 12. In step S1115, the overall control calculation unit 509 sets the after-flag to OFF, and the process proceeds to step S1116.

In step S1116 in FIG. 12, the overall control calculation unit 509 determines whether or not the in-progress-flag is "ON". If the in-progress-flag is "ON", the process proceeds to step S1120. If the in-progress-flag is "OFF", the process proceeds to step S1117, and the overall control calculation unit 509 determines whether or not the before-flag is "ON". If the before-flag is "ON", the process proceeds to step S1121. If the before-flag is "OFF", the process proceeds to step S1118.

In step S1118, the overall control calculation unit 509 determines whether or not the after-flag is "ON". If the after-flag is "ON", the process proceeds to step S1122. If the after-flag is "OFF", the process proceeds to step S1119. If all of the in-progress-flag, the before-flag, and the after-flag are "OFF", it is determined that there is no moving image worth being recorded, and the moving image data is not stored (S1119). In step S1123, the acquisition process of the moving image storage position information ends.

In contrast, if the setting is not "AUTO", in step S1105 in FIG. 12, the overall control calculation unit 509 determines whether or not the setting information selected on the menu screen is "in-progress". If it is determined that the setting information is "in-progress", the in-progress-flag is set to "ON", and the process proceeds to step S1120. If it is determined that the setting information is not "in-progress", the process proceeds to step S1106. In step S1106, the overall control calculation unit 509 determines whether or not the setting information selected on the menu screen is "before". If it is determined that the setting information is "before", the before-flag is set to "ON", and the process proceeds to step S1121. If it is determined that the setting information is not "before", the process proceeds to step S1107. In step S1107, the overall control calculation unit 509 determines that the setting information that has been selected on the menu screen is "after", sets the after flag to "ON", and the process proceeds to step S1122. In steps S1105, S1106, and S1107, the flags corresponding to "before", "in-progress", and "after" that have been selected on the menu screen by the user are set to "ON".

Since the in-progress flag is "ON" in step S1120, the overall control calculation unit 509 determines the moving image storage position to be the position of capturing-in-progress of the still image, and the process proceeds to step S1123. Additionally, since the before-flag is ON in step S1121, the overall control calculation unit 509 determines the moving image storage position to be the position before the still image capturing, and the process proceeds to step S1123. Since the after-flag is ON in step S1122, the overall control calculation unit 509 determines the moving image storage position to be the position after the still image capturing, and the process proceeds to step S1123. In step S1123, the acquisition process of the moving image storage position information ends.

According to the present embodiment, as information for determining the moving image storage position, information related to whether or not the capturing mode is a mode that performs electronic flash emission, whether or not AF scanning is being performed, whether or not the panning operation has been performed, and whether or not the imaging apparatus moves immediately after still image capturing, is used. These pieces of information are examples, and the moving image storage position can be determined by acquiring any information and combining a plurality of pieces of information.

Second Embodiment

Next, a second embodiment of the present invention will be described with reference to FIG. 15. In the present embodiment, a process that determines the moving image storage position by using the AF and capturing instruction information, information indicating the presence or absence of detection or a detection state of a predetermined object (for example, a person and a face), audio input information, and information indicating the period of time of lighting an AF auxiliary light source, is shown. The description of items similar to those in the first embodiment will be omitted, and differences from the first embodiment will be described.

Figure 15:
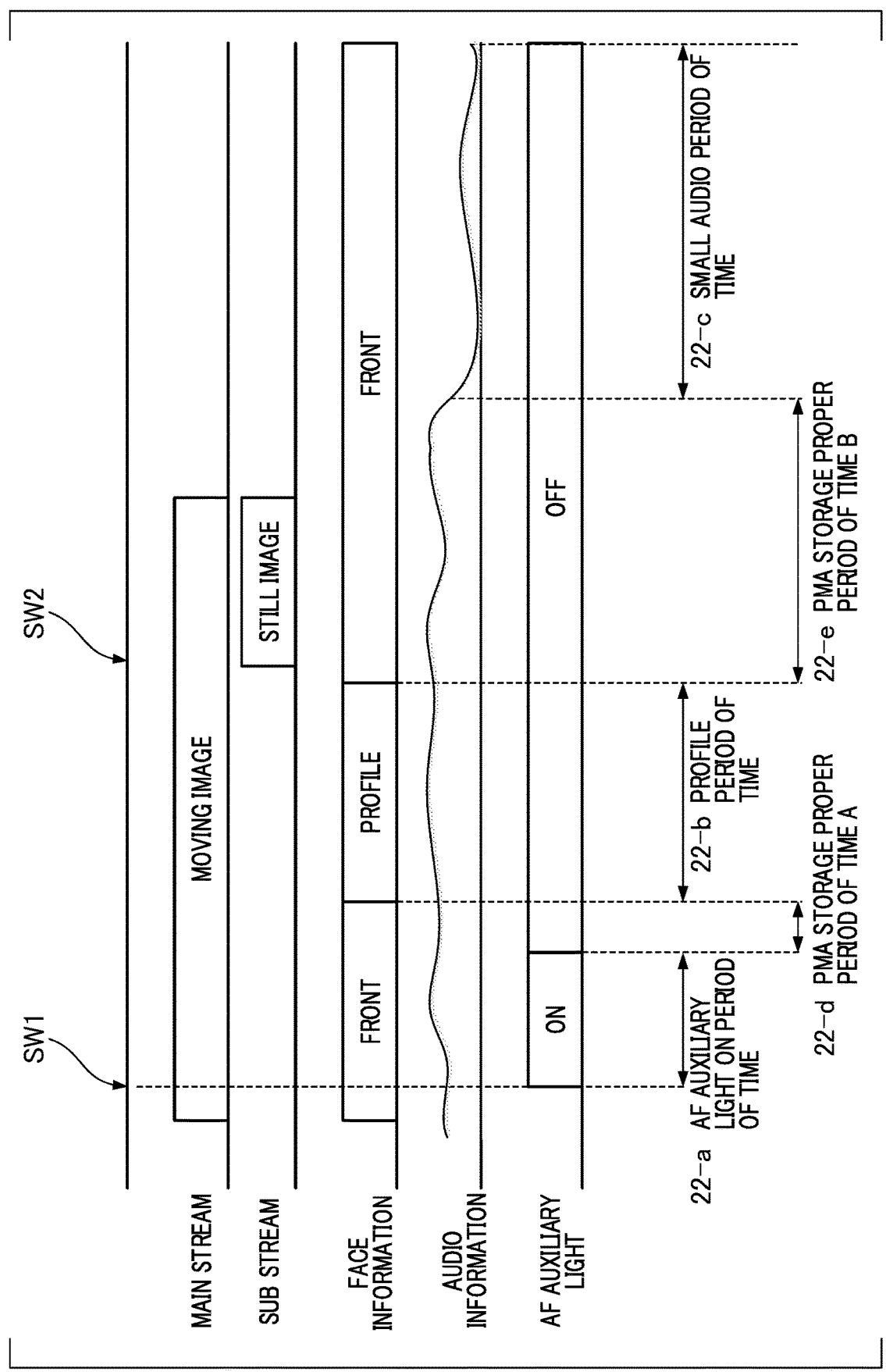
FIG. 15 is a timing chart that illustrates the acquisition processing of the moving image storage position information according to the second embodiment.

FIG. 15 is a timing chart that illustrates the process of step S1009 (acquisition of moving image storage position information) in FIG. 10 in the present embodiment. In FIG. 15, time elapses from the left to the right, the timing of the AF instruction from the operation unit 515 is denoted by "SW1", and the timing of the capturing instruction is denoted by "SW2". For example, SW1 is the point in time when a first switch is turned on by the half press operation of the release button by the user, and SW2 is the point in time when a second switch is turned on by the full press operation in which the release button is further pushed. On the lower side thereof, the states of the main stream and sub stream of the imaging element 506, face information, audio information, and the states of the AF auxiliary light are respectively shown. The face information of the object is calculated by the imaging signal processing circuit 507 and the overall control calculation unit 509 based on the signal from the imaging element 506, and then the front state in which the face of the object faces the front with respect to the imaging apparatus and a profile state in which the face of the object faces the side with respect to the imaging apparatus are illustrated. Additionally, audio information (audio input information) indicates an audio signal acquired by collecting audio by a microphone. The acquired audio signal is stored in the moving image file after synchronizing with the moving image data that has been acquired at the same time. The AF auxiliary light is used to increase the AF accuracy in the dark, and represents the ON state (period of time of lighting) and OFF state (period of time during which the lighting is off) of light emission of the AF auxiliary light source are illustrated.

The AF operation starts at the timing of SW1, and the AF auxiliary light becomes in the ON state for a while from this point in time. The ON period of time of the AF auxiliary light is shown in (22-a). As the face information, the period of time during which the face of the object temporarily changes from the front state to the profile state, in other words, the state in which the face of the object is not facing the front (22-b), is shown. Subsequently, the face of the object returns from the profile state to the front state. Additionally, regarding audio information, a small audio period of time during which a level of the audio signal becomes less than the predetermined threshold value is illustrated in (22-c). (22-d) and (22-e) are periods of time that do not belong to any of the above periods of time, and are periods of time suitable for the PMA mode. Specifically, the overall control calculation unit 509 determines the optimum period of time for storing the moving image in the PMA mode from a PMA storage optimal period of time A shown in (22-d) and a PMA storage proper period of time B shown in (22-e). As an example, if the length of the PMA storage proper period of time B is longer than a predetermined threshold time (for example, 4 seconds) and the length of PMA storage proper period of time is shorter than the predetermined threshold time, a process that stores moving images in the PMA mode during the PMA storage proper period of time B is performed. Alternatively, an optimum PMA storage proper period of time may be determined by combining the determination result with the determination based on the example of the first embodiment. Additionally, if there is a plurality of PMA storage proper periods of time, the overall control calculation unit 509 can optionally set a criterion in determining which period is to be optimized. The determination process is executed in accordance with a determination criterion for which, for example, a period of time in a moving image part close to the period of time of a still image pertaining to a sub stream, a period of time in which a relatively long moving image part is present, a period of time earlier in time (past), are prioritized.

If the AF and capturing instructions are performed in the moving image and the still image mode, the overall control calculation unit 509 according to the present embodiment performs a process that acquires a period of time that satisfies the following conditions to serve as a candidate of the optimum period of time for storing the moving image in the PMA mode:

The face of the object faces the front with respect to the imaging element.

The audio input information (the size of the audio signal) is equal or larger than a predetermined threshold.

The light emission of the AF auxiliary light source in focus adjustment is in an OFF state.

The overall control calculation unit 509 determines the moving image storage position from the candidates of the period of time that satisfies these conditions, in accordance with a predetermined criterion. Note that the capturing instruction is not limited only to the instruction by the user. For example, if a predetermined event occurs, if an external sensor such as an infrared ray sensor is used, if a predetermined object is captured based on the acquired image, or if a difference occurs in the captured image, an instruction may be automatically provided from, for example, the overall control calculation unit 509. Note that, although the present embodiment has been described based on a configuration in which a plurality of pieces of image data is acquired from one imaging element 506, the present invention can be applied to a compound eye configuration that uses a plurality of imaging elements including the same angle of view.

In the above embodiment, it is possible to acquire moving image data at a timing independent of the timing of still image capturing by eliminating a temporal dependence between moving image capturing and still image capturing performed simultaneously, and to store the moving image data in the recording medium. According to the above embodiment, in an imaging apparatus that can simultaneously acquire a moving image and a still image, it is possible to appropriately determine a frame to be used for a moving image. Additionally, it is also possible to prevent the moving image data from dropping frames or to prevent the audio signal being interrupted at the timing of still image capturing.

Other Embodiments

Recording on a storage medium (eg, one or more programs) recorded on a storage medium (which may also be referred to more fully (a) non-transitory computer-readable storage medium') and/or that includes one or more circuits (eg application specific integrated circuit (ASIC)) for performing the function of one or more of the above-described embodiments (s), and by a method performed by the computer of the system or apparatus by, for example, reading out and executing the computer executable instructions from the storage medium to perform The functions of one or more circuits to perform the functions of one or more processes (one or more) (eg, The computer executable instructions may be provided to the computer, for example, from The storage medium may include, for example, one or more a hard disk, a random-access memory (RAM), a read only memory (ROM), a storage of distributed computing systems, an optical a flash memory device, a memory card, and the like. "disk (such as a compact disc (CD), digital versatile disc (DVD), or Blu-ray Disc (BD)

The scope of the following claims is to be accorded the broadest interpretation so as to encompass all such modifications and equivalent structures and functions.

This application claims the benefit of Japanese Patent Application No. 2018-109487, filed Jun. 7, 2018, and Japanese Patent Application No. 2019-027408, filed Feb. 19, 2019, which are hereby incorporated by reference in their entirety.

What is claimed is:

1. An imaging apparatus having (a) an imaging unit that outputs data of a plurality of pixel portions by a first stream and (b) a memory unit having a buffer function that stores image signals of a plurality of frames based on the data, the imaging apparatus comprising:

a controller having a processor which executes instructions stored in a memory or having circuitry, the controller being configured to function as:

(1) an acquisition unit configured to acquire still image data that corresponds to a timing at which an instruction to capture a still image has been provided, by a second stream that is different from the first stream in the imaging unit;

(2) a determination unit configured to determine a frame to be used for a moving image that corresponds to the timing from the frames stored in the memory unit; and (3) a control unit configured to perform control in which an image signal of the frame to be used for the moving image determined by the determination unit is output to a storage destination, wherein a resolution of the data output by the first stream is lower than a resolution of the still image data output by the second stream, and wherein the still image data is output by the second stream while the data is output by the first stream.

2. The imaging apparatus according to claim 1, further comprising:

an instruction unit configured to provide an instruction to capture a still image and a moving image; and a selection unit configured to select a timing of capturing the moving image with respect to the capturing of the still image, wherein the determination unit determines a frame to be used for a moving image corresponding to the timing of capturing the moving image that has been selected by the selection unit.

3. The imaging apparatus according to claim 2, wherein the selection unit selects the timing of capturing the moving image from before capturing, capturing-in-progress, or after capturing of the still image capturing.

4. The imaging apparatus according to claim 2, wherein the determination unit determines a frame to be used for the moving image in accordance with at least one of a capturing mode, information indicating the presence or absence of a focus adjustment operation or a lighting period of time of an auxiliary light source in the focus adjustment, movement of the imaging apparatus, audio input information, and presence or absence of detection of an object or a detection state of the object.

5. The imaging apparatus according to claim 4, wherein, in a capturing mode in which electronic flash emission is performed, the determining unit does not determine a frame that corresponds to capturing-in-progress of the still image capturing as a frame to be used for the moving image.

6. The imaging apparatus according to claim 4, wherein, if the focus adjustment operation is performed before capturing of the still image capturing, the determination unit does not decide a frame that corresponds to before capturing of the still image capturing as a frame to be used for the moving image.

7. The imaging apparatus according to claim 4, wherein, if a movement amount of the imaging apparatus is larger than a threshold before capturing or after capturing of the still image capturing, the determination unit does not decide a frame that corresponds to before capturing or after capturing of the still image capturing as a frame to be used for the moving image.

8. The imaging apparatus according to claim 1, further comprising:
   a display unit configured to display options indicating before capturing, capturing-in-progress, and after capturing of the still image capturing as a timing of moving image capturing with respect to the still image capturing; and
   an operation unit configured to instruct any one of the options,
   wherein the determining unit determines a frame to be used for the moving image that corresponds to before capturing, capturing-in-progress, or after capturing of the still image capturing that has been instructed by the operation unit.

9. The imaging apparatus according to claim 1, further comprising:
   a signal processing unit configured to process a signal output from the imaging unit,
   wherein the imaging unit outputs data for a moving image to the signal processing unit through a first output line and outputs data for a still image to the signal processing unit through a second output line.

10. The imaging apparatus according to claim 1, wherein the imaging unit includes an imaging layer having the pixel portions and a circuit layer having a calculation unit that performs a calculation that reduces a data amount of the moving image.

11. A control method executed by an imaging apparatus having (a) an imaging unit that outputs data of a plurality of pixel portions by a first stream and (b) a memory unit having a buffer function that stores image signals of a plurality of frames based on the data, the method comprising:
   acquiring still image data corresponding to a timing at which an instruction to capture a still image has been provided by a second stream that is different from the first stream in the imaging unit;
   determining a frame to be used for a moving image that corresponds to the timing from a plurality of frames stored in the memory unit; and
   performing control in which an image signal of a frame to be used for the determined moving image is output to a storage destination,
   wherein a resolution of the data output by the first stream is lower than a resolution of the still image data output by the second stream, and wherein the still image data is output by the second stream while the data is output by the first stream.

* * * * *